US 6,625,296 B2

(12) United States Patent
Price et al.

(10) Patent No.: US 6,625,296 B2
(45) Date of Patent: *Sep. 23, 2003

(54) METHOD AND SYSTEM FOR FREEFORM DIGITAL INK ANNOTATION OF DATA TRACES

(75) Inventors: Morgan N. Price, Palo Alto, CA (US); Gene Golovchinsky, Palo Alto, CA (US); William N. Schilit, Menlo Park, CA (US)

(73) Assignees: Fuji Xerox Co., Ltd., Tokyo (JP); Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 411 days.

(21) Appl. No.: 09/184,588

(22) Filed: Nov. 3, 1998

(65) Prior Publication Data

US 2001/0043716 A1 Nov. 22, 2001

(51) Int. Cl.[7] ................................................. G06K 9/00
(52) U.S. Cl. ..................... 382/100; 348/231.3; 128/697
(58) Field of Search ............................... 382/100, 115, 382/187, 316; 704/270; 604/27; 348/231.3; 128/697; 367/24

(56) References Cited

U.S. PATENT DOCUMENTS

| 5,564,005 A | * | 10/1996 | Weber et al. ............... 395/161 |
| 5,583,980 A | * | 12/1996 | Anderson ................... 345/473 |
| 5,600,775 A | * | 2/1997 | King et al. ................. 395/806 |
| 5,724,985 A | * | 3/1998 | Snell et al. ................. 600/510 |
| 5,730,720 A | * | 3/1998 | Sites et al. .................... 604/27 |
| 5,845,161 A | * | 12/1998 | Schrock et al. ............. 363/313 |
| 5,926,567 A | * | 7/1999 | Collins et al. .............. 382/187 |
| 5,970,455 A | * | 10/1999 | Wilcox et al. .............. 704/270 |
| 5,986,655 A | * | 11/1999 | Chiu et al. .................. 345/349 |
| 6,064,751 A | * | 5/2000 | Smithies et al. ............ 382/115 |
| 6,106,457 A | * | 8/2000 | Perkins et al. .............. 600/175 |

OTHER PUBLICATIONS

Weber et al., *Marquee: A Tool For Real–Time Video Logging*, In Proceedings of CHI '94, ACM Press (Apr., 1994).
Wilcox et al., *Dynomite: A Dynamically Organized Ink and Audio Notebook*, In Proceedings of CHI '97, ACM Press, (1994).
Ishii et al., *Integration of Interpersonal Space and Shared Workspace: ClearBoard Design and Experiments*, ACM Trans. Inf. Syst. II, 4, (1993), pp. 349–375.

* cited by examiner

Primary Examiner—Jayanti K. Patel
Assistant Examiner—M B Choobin
(74) Attorney, Agent, or Firm—Oliff & Berridge, PLC

(57) ABSTRACT

The method and system of the invention enables free-from digital ink annotation of data traces and storage management of the data trace based upon the free-from digital ink annotations. An embodiment of the system and method of the invention receives a freeform digital ink annotation on a data trace, maps the freeform digital ink annotation to the data corresponding to the annotated portions of the data trace and renders the freeform digital ink annotations on a display of the data trace.

25 Claims, 9 Drawing Sheets

DATA TRACE DATA STRUCTURE 90

| DATA VALUE | TIME |
|---|---|
|  |  |
|  |  |
|  |  |

ANNOTATION DATABASE DATA STRUCTURE 96

| ANNOTATION ID | STARTING TIME | ENDING TIME | OFFSET | OFFSET | OFFSET | OFFSET |
|---|---|---|---|---|---|---|
|  |  |  |  |  |  |  |
|  |  |  |  |  |  |  |
|  |  |  |  |  |  |  |

METHOD AND SYSTEM FOR FREEFORM DIGITAL INK ANNOTATION OF DATA TRACES

BACKGROUND OF THE INVENTION

1. Field of Invention

This application is directed to an electronic data trace annotation system that supports annotation of data traces. In particular, this invention is directed to the creation of freeform digital ink annotations on data traces.

2. Description of Related Art

The standard approach to annotating data traces is to annotate directly on a hard copy of the data trace. As an example, a polygraph examiner works with a continuous paper trace that records an examinee's physiological responses to questions. As the examiner asks questions, the examiner annotates the paper trace to indicate such things as when a question is asked and also to provide reference annotations and comments about the data trace. These annotations help the examiner correlate the questions to the physiological responses and to interpret the data in real time. Another example of annotation of a data trace is the annotations that a doctor makes on a paper trace of a cardiogram.

Conventional ink annotation systems support associating ink with the underlying media. However, these systems do not support freeform digital ink annotations on a visual display of a data trace. Furthermore, these systems do not manage the storage of the data trace based upon freeform digital ink annotations. Although the systems described in *Marquee: A Tool For Real-Time Video Logging*, by Weber et al., In Proceedings of CHI '94, ACM Press (April 1994) and *Dynomite: A Dynamically Organized Ink and Audio Notebook*, by Wilcox et al., In Proceedings of CHI '97, ACM Press, (1994) associate freeform digital ink annotations with time, the ink is associated with the time of the annotation and not the time of the underlying events. While Dynomite allows users to select regions in an audio data trace by dragging endpoints on an audio toolbar, it does not permit freeform digital ink annotation on the data trace.

A system known as "ClearBoard", which is disclosed in *Integration of Interpersonal Space and Shared Workspace: ClearBoard design and experiments*, by Ishii, et al., ACM Trans. Inf. Syst. II, 4, (1993), pp 349–375, uses a metaphor of "talking through and drawing on a transparent glass window." Users of the ClearBoard system can draw and view video on the same display. However, ClearBoard does not present an automatic data trace that simultaneously presents data values for multiple times and does not correspond the freeform digital ink annotation to the data underlying the data trace in any way.

SUMMARY OF THE INVENTION

The present invention is a method and system for annotating and managing data traces such as audio traces, barograms, electrocardiograms, electroencephalograms, electrograms, electromyograms, kymograms, polygraphic traces, seismograms, thermograms, etc. The system and method of this invention provides the ability to annotate directly on a computer rendition of a data trace. The annotation may be made as the data trace is being captured, during playback or simply as the data trace is viewed statically. The data traces are generally generated from streams of data which change over time. Data traces are generally persistent records of the values of the data stream. Conventionally, data traces are two dimensional, the two dimensions being the time and the amplitude of the changing value. However, it is to be understood that the method and system of the present invention is equally applicable to a data trace having more than two dimensions such as a polygraph, or the like, that may have parallel axes for each sensed characteristic of the polygraph examinee.

The system and method of the invention present a data trace on a pen computer and support freeform digital ink annotation on that data trace. The system can automatically select regions in the data trace based upon the position of the annotation, can automatically summarize data traces, and can manage the storage of the data of a data trace based upon the freeform digital ink annotations.

BRIEF DESCRIPTION OF THE DRAWINGS

The preferred embodiments of this invention will be described in detail, with reference to the following figures, wherein:

FIG. 4 shows a data trace data structure in accordance with an embodiment of the invention;

FIG. 5 shows an annotation database data structure in accordance with an embodiment of the invention;

These and other features and advantages of this invention are described in or are apparent from the following detailed description of the preferred embodiments.

DETAILED DESCRIPTION OF PREFERRED EMBODIMENTS

Figure 1:
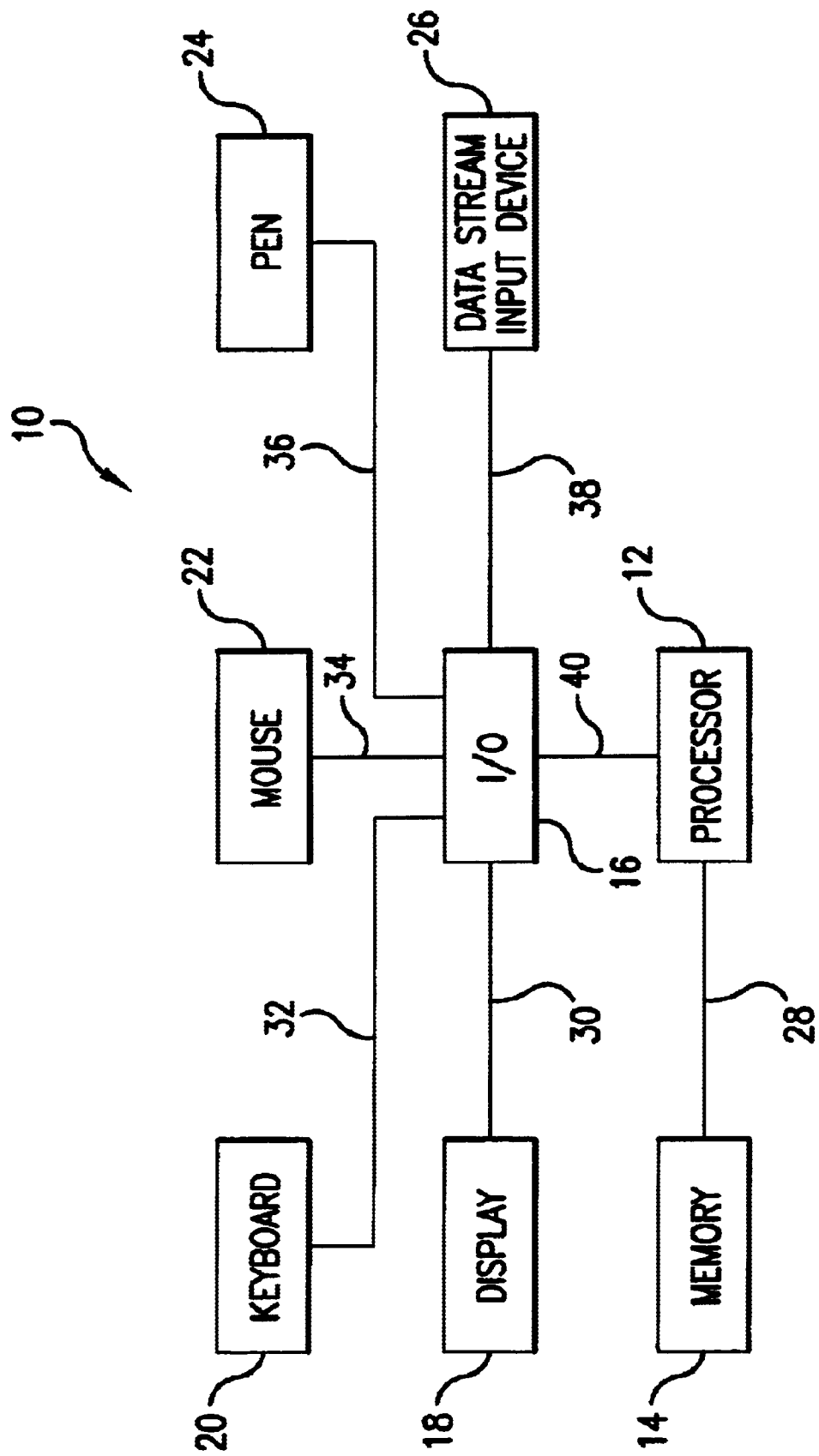
FIG. 1 is a block diagram of an embodiment of the electronic data trace annotation system of this invention.

FIG. 1 shows an embodiment of the electronic data trace annotation system of this invention. The electronic data trace annotation system 10 includes a processor 12 communicating with a memory 14 that stores the program, the data underlying the data trace and other data for practicing the invention. The processor 12 also communicates with a display 18, a keyboard 20, a mouse 22, a pen 24, and a data stream input device 26 via input/output device 16. The keyboard 18, the mouse 22, the pen 24 and any other interface device (not shown) are operated by a user to control the operation of the electronic data stream annotation system 10. Control of the electronic data stream annotation system 10 is not limited to the interface devices shown and does not require any particular interface device. The display 18 may be on a stand-alone pen computer or a tablet connected by a tether to a conventional computer. Pen 24 may be a pen tablet, a pen display, a pen display tablet, a pen computer or any other type of pen based input device or touchscreen.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flow charts shown in FIGS. 6A–9 can be used to implement the system 10.

Additionally, as shown in FIG. 1, the memory 14 is preferably implemented using static or dynamic RAM. However, the memory 14 can also be implemented using a floppy disk and disk drive, a writable optical disk and disk drive, a hard drive, a flash memory or the like. Additionally, it should be appreciated that the memory 14 can be either distinct portions of a single memory or physically distinct memories.

Further, it should be appreciated that the links 28, 30, 32, 34, 36, 38 and 40 connecting the memory 14, the display 18, the keyboard 20, the mouse 22, the pen 24, the data stream input device 26 and the input/output device 16 to the processor 12 can be wired or wireless links to networks (not shown). These networks can be local area networks, wide area networks, intranets, the Internet, or any other distributed processing and storage networks.

Figure 2B:
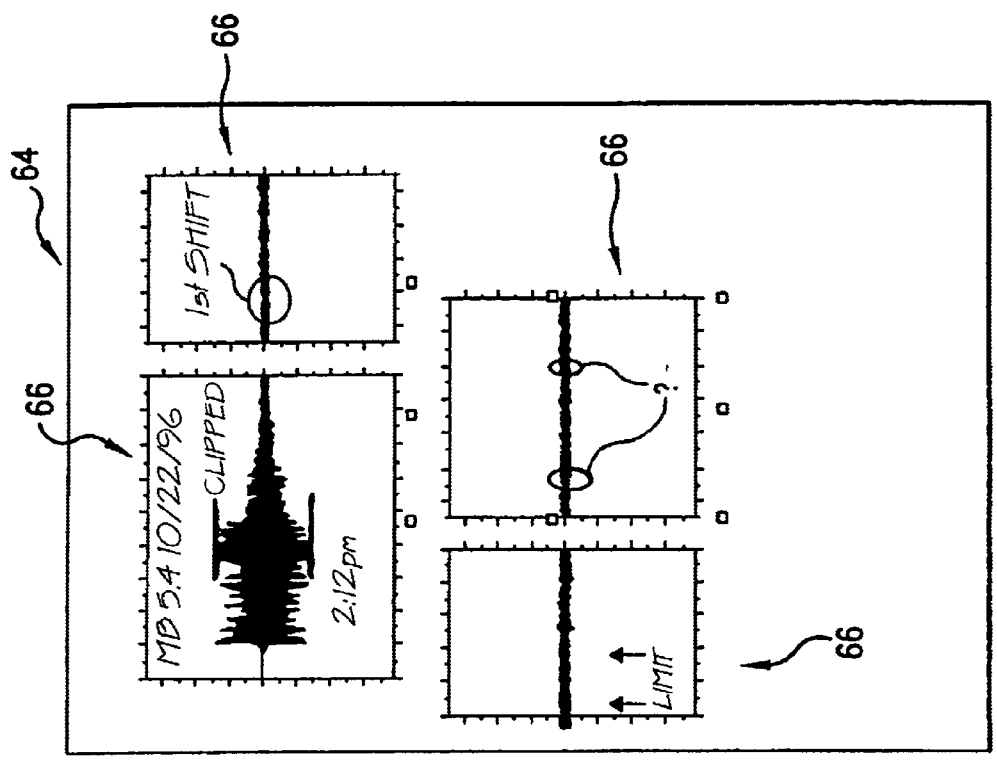
FIG. 2B shows a summary of the annotated seismogram of FIG. 2A using the annotations in accordance with an embodiment of the invention.
Figure 2A:
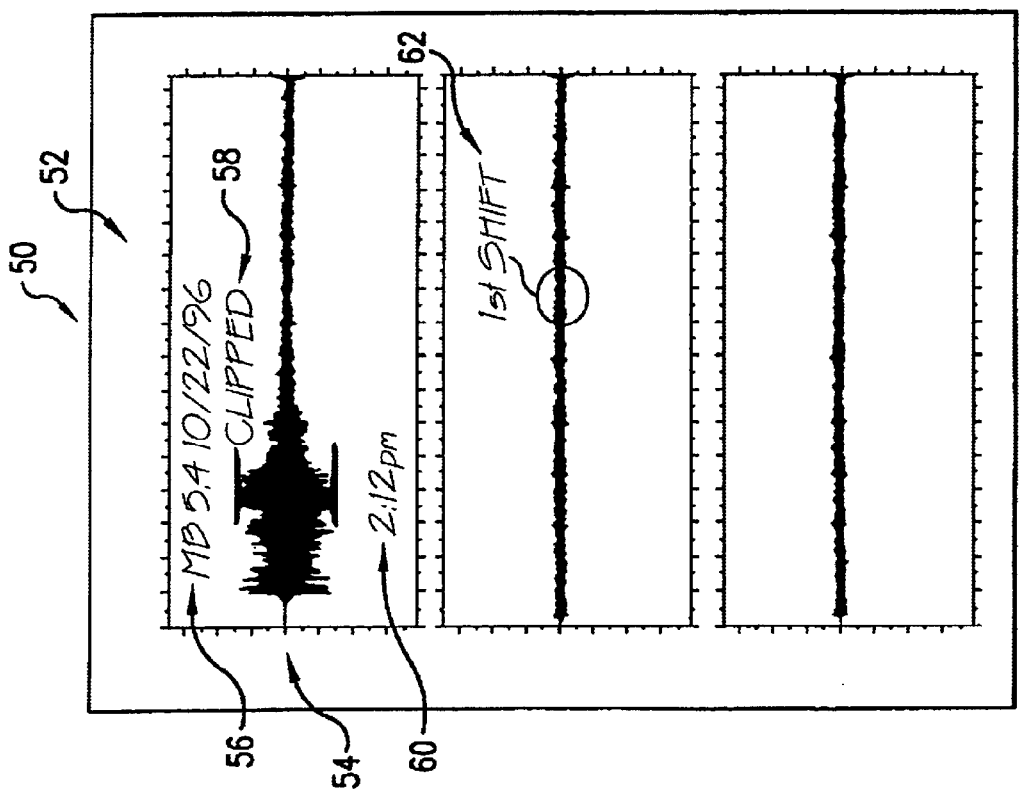
FIG. 2A shows an annotated seismogram in accordance with an embodiment of this invention.

FIG. 2A shows a display 50 of an annotated seismogram 52. The seismogram 52 has a data trace 54 that has been annotated at 56, 58, 60 and 62. As shown in FIG. 2B, an embodiment of the system and method of this invention interprets the freeform digital ink annotations as selections of portions of the seismogram. The embodiment then presents a display 64 of annotated portions of the data trace 66. An embodiment of the system and method of the invention may also reduce the amount of storage that is required for the data trace by compressing or deleting the portions of the data trace that have not been annotated.

The method and system of the invention may be applied to time-based data and may be particularly useful for time-based data having important information that is localized and infrequent. Data traces from many different types of scientific instruments have this property of important information being localized and infrequent and, therefore, can benefit from the ability of the system and method of this invention to summarize and manage storage of data traces of those portions based upon freeform digital ink annotations.

Figure 3B:
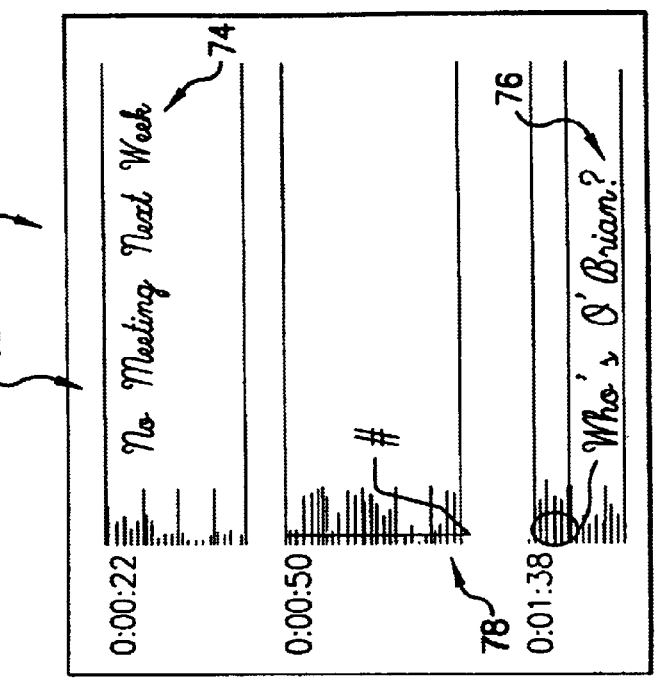
FIG. 3B shows a summary of the annotated audio trace of FIG. 3A in accordance with an embodiment of this invention.
Figure 3A:
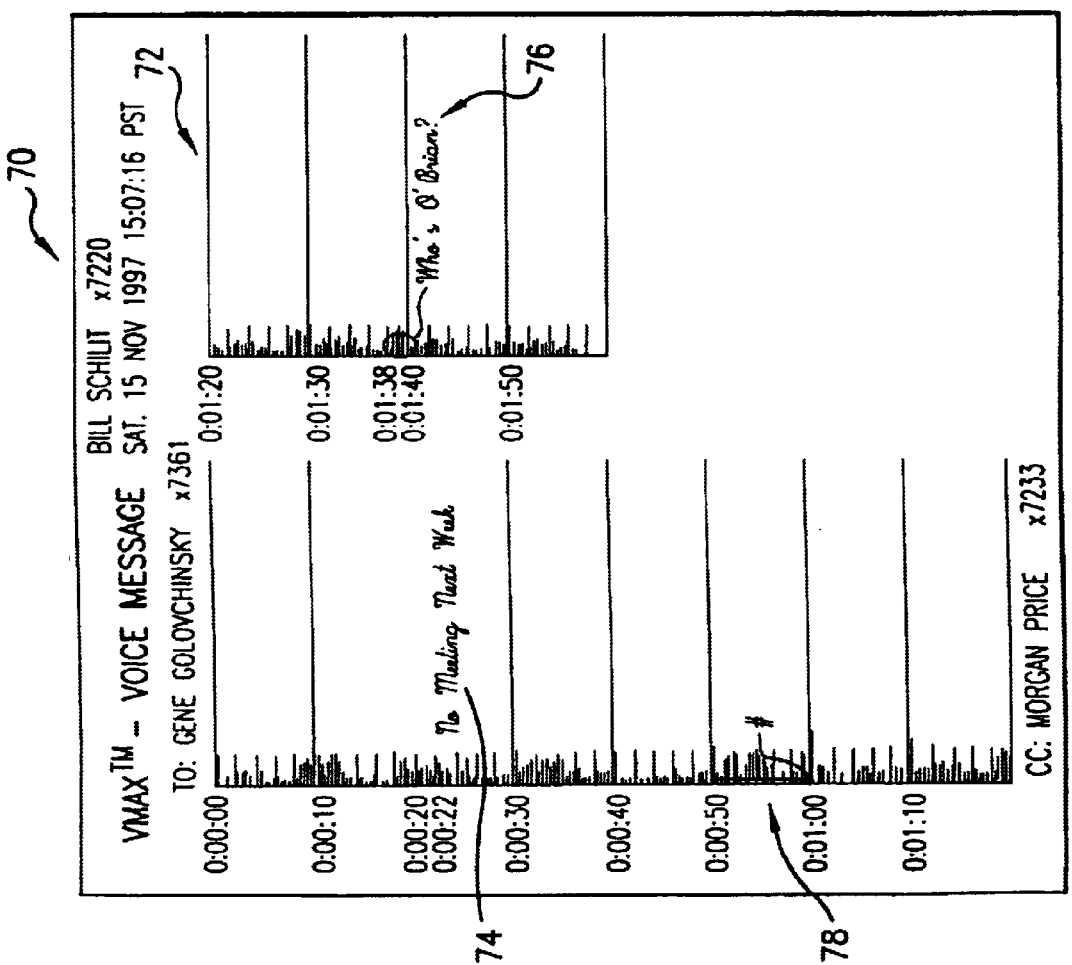
FIG. 3A shows an annotated audio trace of a voice mail message in accordance with an embodiment of this invention.

FIG. 3A shows a display 70 with an annotated audio data trace of a voice mail message 72. The audio trace 72 has freeform digital ink annotations 74, 76 and 78. The freeform digital ink annotations 74, 76 and 78 are associated with corresponding portions of the audio trace 72.

FIG. 3B shows a display 80 with a summary 82 of the audio data trace 72 of FIG. 3A. The summary 82 only shows those audio portions of the data trace 72 that correspond to freeform digital ink annotations 74, 76 and 78. In this manner, an embodiment of the method and system of the invention designates audio portions corresponding to freeform digital ink annotations and may present a summary of the data trace and also may manage the storage of the data underlying the data trace in accordance with the freeform digital ink annotations. In one example, the portions of the data trace that have not been annotated may be managed by deleting them from storage or memory.

It is to be understood that the portions of a data trace that correspond to free form digital ink annotations may be compressed, archived, copied, transmitted, deleted, or may have any other type of storage management function performed on those portions.

Additionally, an embodiment of the method and system of the invention provides the ability to replay the data trace or portions of the data trace that correspond to freeform digital ink annotations.

An embodiment of the method and system of the invention permits freeform digital ink annotation directly on an active trace. The data trace may continuously scroll from one edge of the screen to the other, or the trace might extend from one edge to the other, and then start over, such as by, for example, a page turn. The embodiment may, optionally, temporarily "freeze" the page layout on detecting a pen down either by halting the scrolling of the display or by preventing a page turn while the user annotates the data trace.

An embodiment of the method and system of the invention also provides a note taking area adjacent to but not directly correlated to the data trace. This allows larger annotations than would fit on the data trace. Optionally, in an embodiment of the method and system of the invention the user may be provided with control over the scale of the display of the data trace so that the scale of the entire data trace may be adjusted so that the size of the corresponding portion of the data trace matches or approximates the size of the corresponding freeform digital ink annotation. Similarly, an embodiment may scale the freeform digital ink annotations in correspondence with the scaling of a display of the data trace in accordance with user preferences.

An embodiment of the method and system of the present invention uses processes and data structures that enable rendering of new data on a trace, recording of a freeform digital ink annotation on an automatic trace, rendering of freeform digital ink annotations on automatic traces, viewing a portion of an automatic trace that corresponds to some or all of the freeform digital ink annotations at a user's request and managing the storage of the data trace based upon freeform digital ink annotations.

An embodiment of the method and system of the invention maintains a record of the automatic trace that is organized by time, a current view of the automatic trace, a mapping of the screen selection to time and a record of freeform digital ink annotations which are stored as offsets from some starting time. For simplicity, the detailed description does not include a description of the processes for providing a note taking area or the scaling of the record along with the freeform digital ink annotations at the user's request. However, one of ordinary skill in the art after reading and understanding the detailed description would be enabled to provide these functions.

An embodiment of the system of the invention uses several data structures that provide a record of a data trace over time. These data structures support several operations such as: rendering a trace corresponding to a time range, or a list of time ranges in a view; receiving the time corresponding to the position of the view or the range of times corresponding to a portion of the view; acquiring a position in the view corresponding to a time value and managing storage by deleting, compressing, archiving or copying a record for a range in time.

FIG. 4 shows a data trace data structure 90 in accordance with an embodiment of the present invention. The data trace data structure includes data values 92 and their corresponding times 94.

FIG. 5 shows an annotation database data structure 96 that includes annotation records that each include an annotation ID 98, a starting time 100, an ending time 102 and a list of offsets 104. This annotation database data structure supports the processes of adding an annotation, removing an annotation and acquiring the annotations that correspond to a range of times which are described later herein.

It is to be understood that the data structures of FIGS. 4 and 5 are merely examples of one way in which data may be organized and that the method and system of the present invention is not limited to these, or any other, data structures because one of ordinary skill in the art understands that data may be organized many different ways which are not disclosed in this document and still practice the invention.

Figure 6A:
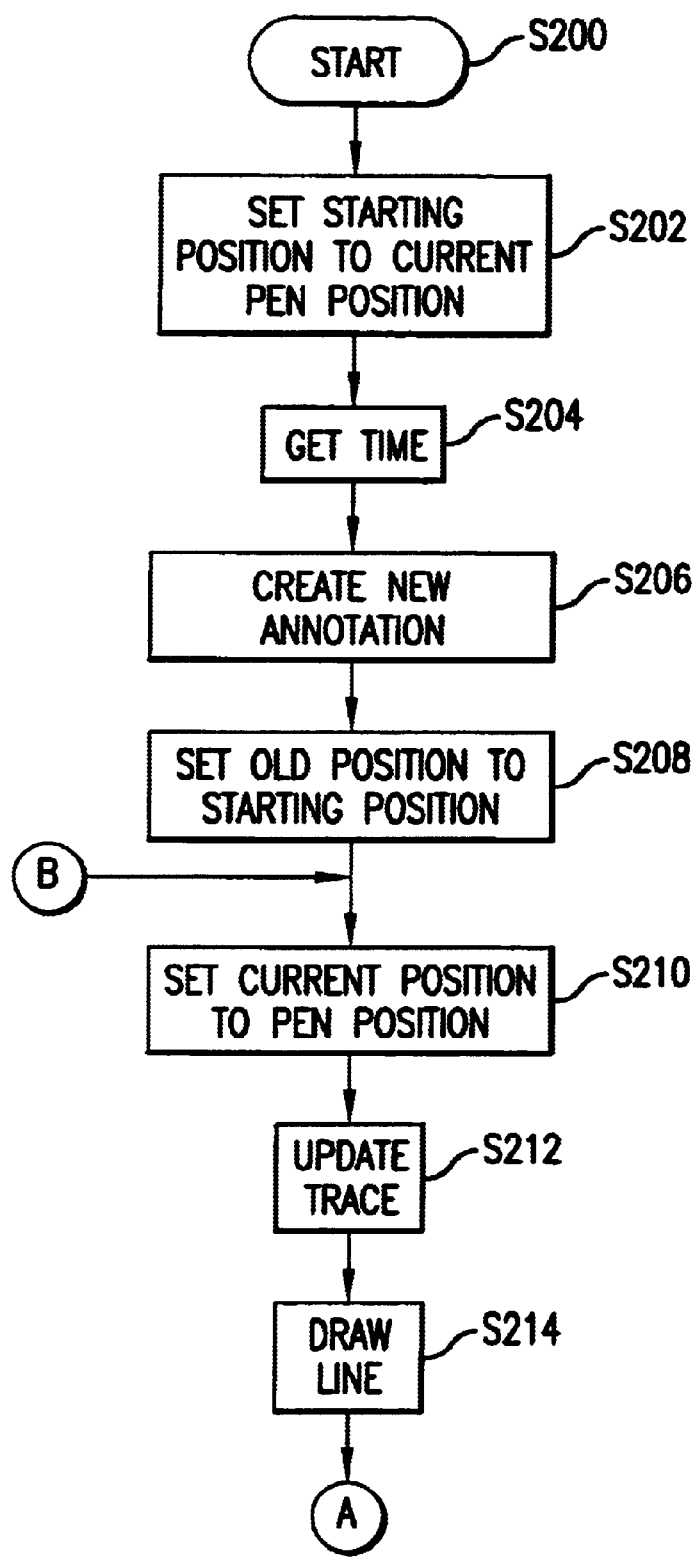
FIGS. 6A and 6B show a flow chart outlining a control routine for recording a freeform digital ink annotation in accordance with an embodiment of the invention.
Figure 6B:
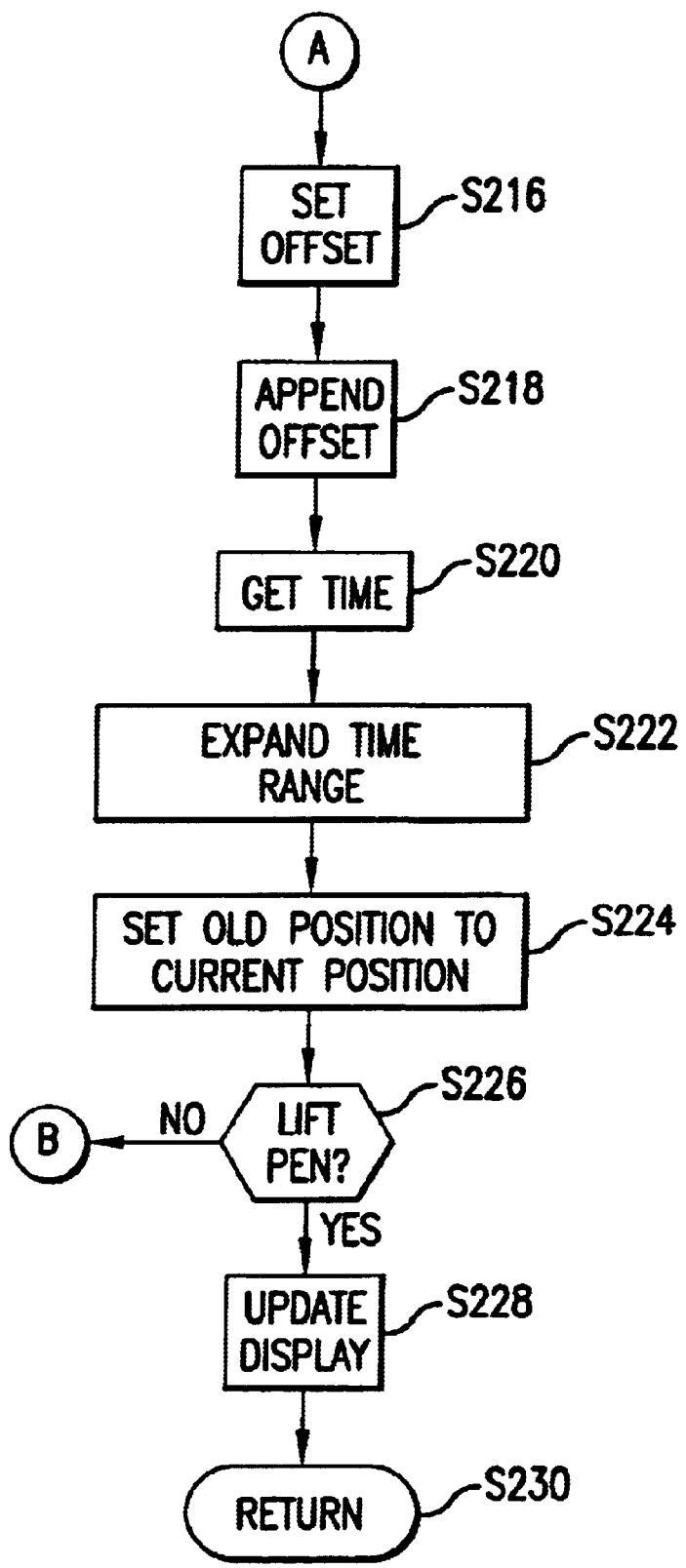

FIGS. 6A and 6B show a flow chart outlining a control routine for recording a freeform digital ink annotation. The control routine starts at step S200 and continues to step S202. In step S202, the control routine sets the starting position to the current position of the pen and continues to step S204. In step S204, the control routine acquires the time that corresponds to the starting position by, for example, using the data trace data structure shown in FIG. 4 and continues to step S206. In step S206, the control routine creates a new annotation record in an annotation database, such as is shown in FIG. 5, from the time of the starting position from step S204, a range containing just that time and no offsets and continues to step S208. In step S208, the control routine sets the old position to the starting position and continues to step S210. In step S210, the control routine sets the current position to the position of the pen and continues to step S212. In step S212, the control routine updates the trace to show new data (if any, preferably without scrolling or paging the trace) and the control routine continues to step S214. In step S214, the control routine draws a line from the old position to the current position. The control routine then continues to step S216.

In step S216, the control routine sets the offset of the current annotation to the current position minus the starting position and continues to step S218. In step S218, the control routine appends the offset to the current annotation in the annotation database and continues to step S220. In step S220, the control routine acquires the time corresponding to the current position in the data trace data structure and continues to step S222. In step S222, the control routine expands the current annotation's time range in the annotation database to include the time of the current position from step S220 and continues to step S224. In step S224, the control routine sets the old position to the current position and continues to step S226. In step S226, the control routine determines whether the user has lifted the pen off of the pen input display. If, in step S226 the control routine determines that the user has not lifted the pen, then the control routine returns to step S210. If, on the other hand, the control routine determines in step S226 that the user has lifted the pen off of the pen input device then the control routine continues to step S228. In step S228, the control routine updates the display to scroll or page the trace, if appropriate, and continues to step S230. In step S230, the control routine returns control to the environment in which the control routine of FIGS. 6A and 6B operate.

Figure 7:
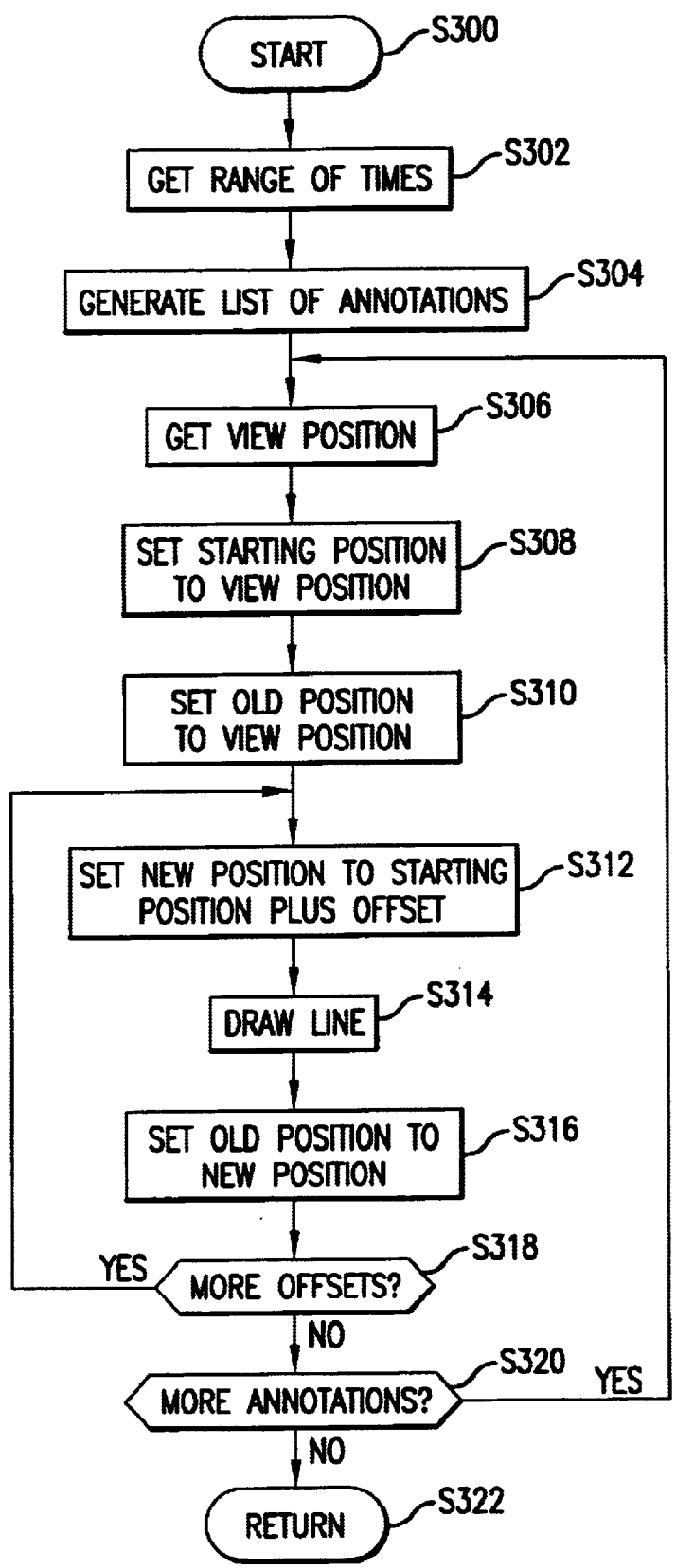
FIG. 7 shows a flow chart outlining a control routine for rendering freeform digital ink annotations on a data trace in accordance with an embodiment of the invention.

FIG. 7 shows a flow chart outlining the control routine for rendering freeform digital ink annotations on the display of a data trace. The control routine starts at step S300 and continues to step S302. In step S302, the control routine determines the range of times that correspond to the entire view of the data trace data structure and continues to step S304. In step S304, the control routine generates a list of annotations that correspond to the time range from step S302 from the annotation database and continues to step S306. In step S306, the control routine determines the view position that corresponds to the times of the annotations from the list generated in step S304 and continues to step S308. In step S308, the control routine sets the starting position to the view position from step S306 and continues to step S310. In step S310, the control routine sets the old position to the position acquired in step S306 and continues to step S312.

In step S312, for each offset in the current annotation the control routine sets the new position to the starting position plus the offset and continues to step S314. In step S314, the control routine draws a line from the old position to the new position and continues to step S316. In step S316, the control routine sets the old position to the new position and continues to step S318. In step S318, the control routine determines whether more offsets exist in the current annotation record. If in step S318, the control routine determines that there are more offsets in the current annotation record, then the control routine returns to step S312 and repeats steps S312, S314 and S316 for each offset in the annotation. If, on the other hand, the control routine determines, in step S318, that there are no more offsets in the current annotation, then the control routine continues to step S320. In step S320, the control routine determines whether there are more annotations in the annotation database. If in step S320, the control routine determines that there are more annotations in the annotation database, then the control routine returns to step S306 where the next annotation is processed. If, on the other hand, the control routine determines that no more annotations exist in the annotation database, then the control routine continues to step S322. In step S322, the control routine returns control to the environment in which the control routine of FIG. 7 operates.

Figure 8:
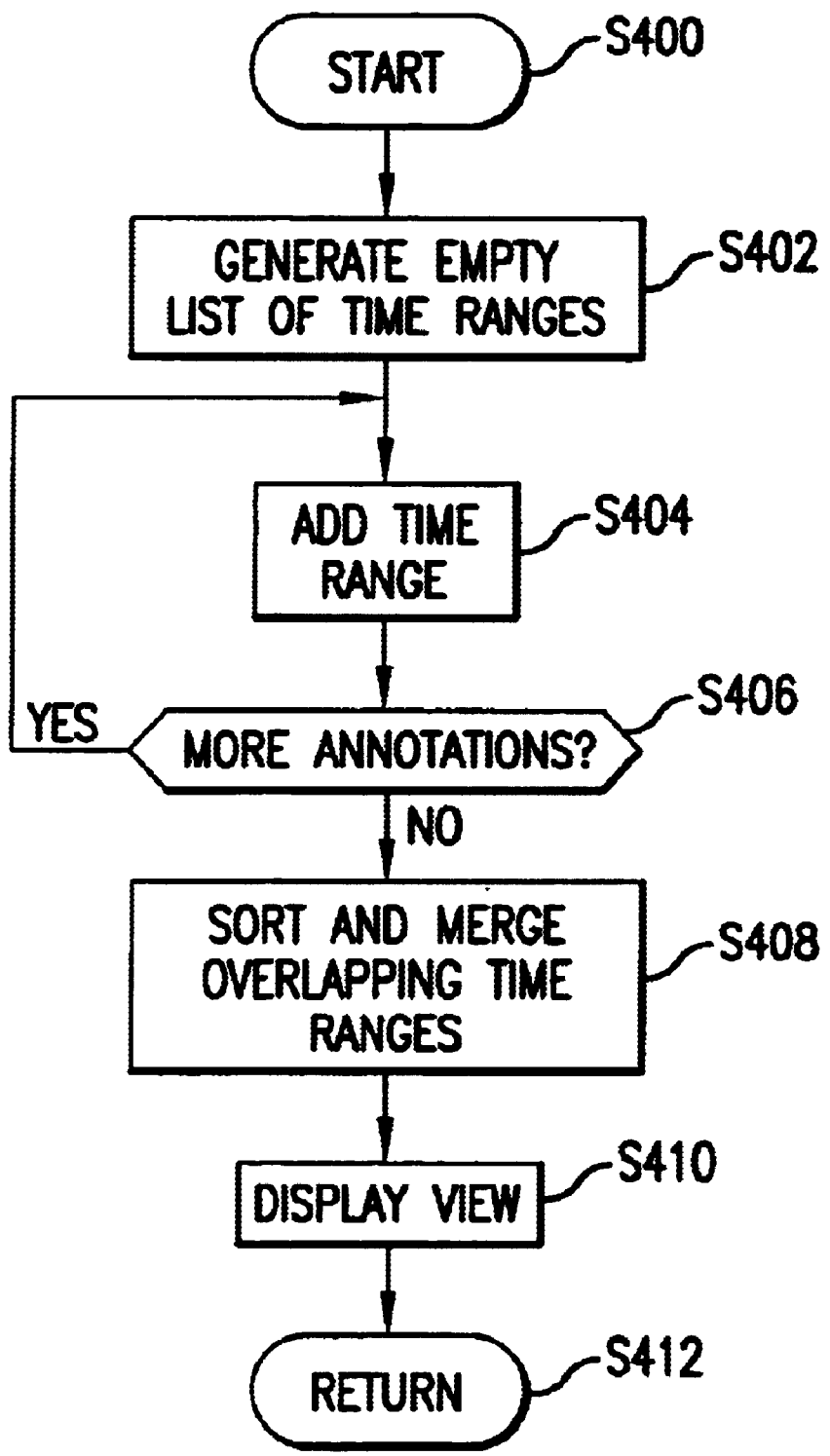
FIG. 8 shows a flow chart outlining a control routine for summarizing a trace using freeform digital ink annotations in accordance with an embodiment of the invention.

FIG. 8 shows a flow chart outlining a control routine of the present invention for summarizing a data trace. The control routine starts at step S400 and continues to step S402. In step S402, the control routine generates an empty list of time ranges and continues to step S404. In step S404, the control routine adds the time range from the first annotation to the list generated in step S402 and continues to step S406. In step S406, the control routine determines whether there are more annotations in the annotation database. If in step S406, the control routine determines that there are more annotations in the annotation database, then the control routine returns to and repeats step S404 for all annotations in the annotation database. If, on the other hand, the control routine determines that there are no more annotations to process in the annotation database, then the control routine continues to step S408. In step S408, the control routine sorts the time ranges by the starting times and merges overlapping time ranges together and continues to step S410. In step S410, the control routine displays a view corresponding to the list of time ranges using the data trace data structure and continues to step S412. In step S412, the control routine returns operation to the environment in which the control routine of FIG. 8 operates.

Figure 9:
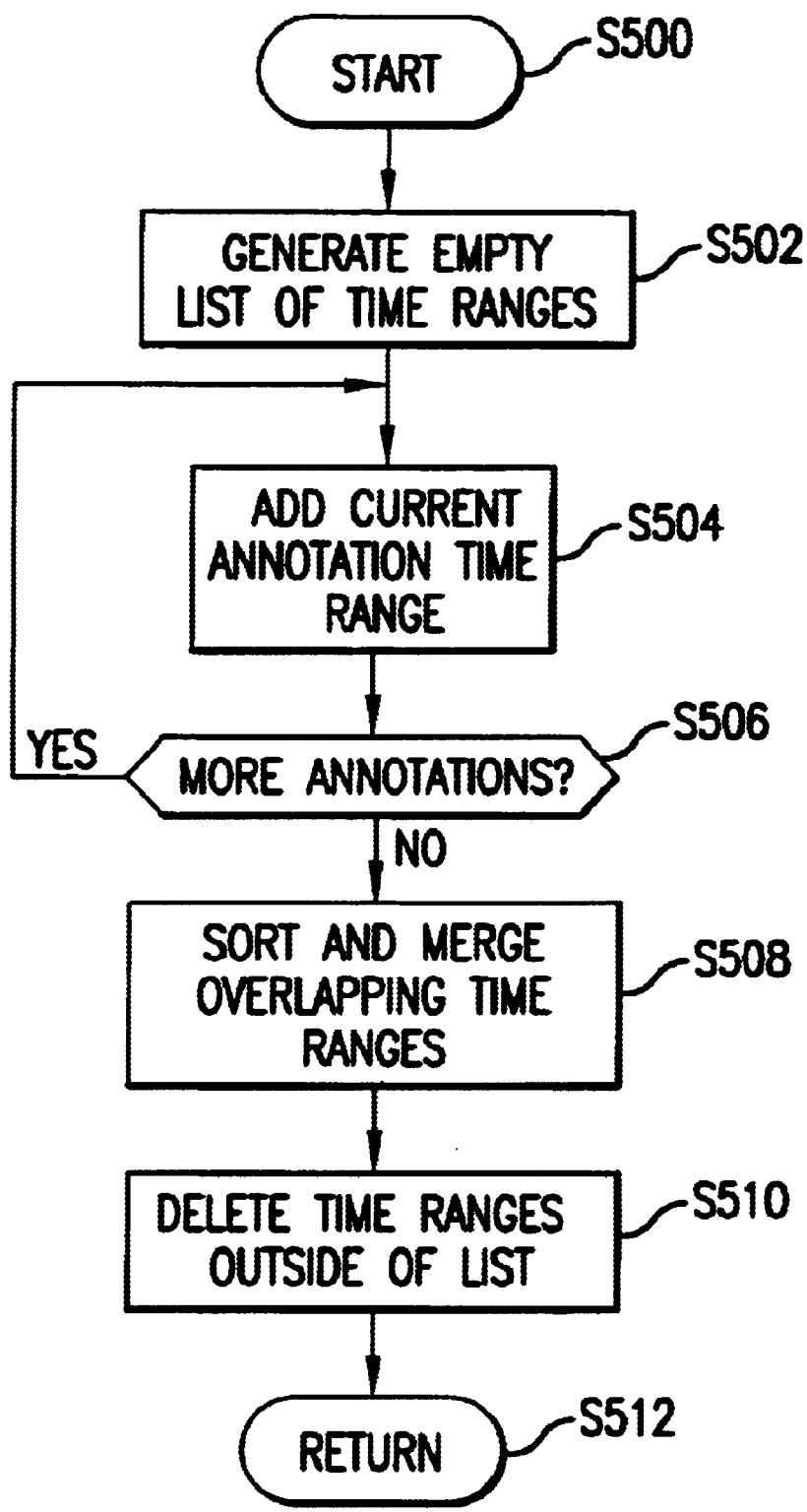
FIG. 9 shows flow chart outlining a control routine for managing the storage of data for a data trace using freeform digital ink annotations in accordance with an embodiment of the invention.

FIG. 9 shows a flow chart outlining a control routine for managing storage for a data trace in accordance with an embodiment of the present invention. The control routine starts at step S500 and continues to step S502. In step S502, the control routine generates an empty list of time ranges and continues to step S504. In step S504, the control routine adds the current annotation's time range in the annotation database to the list generated in step S502 and continues to step S506. In step S506, the control routine determines whether there are more annotations in the annotation database. If in step S506, the control routine determines that more annotations exist in the annotation database, then the control routine returns to and repeats step S504 for each annotation in the annotation database. If, on the other hand, the control routine determines in step S506 that there are no more annotations in the annotation database, then the control routine continues to step S508. In step S508, the control routine sorts and merges overlapping time ranges together and continues to step S510. In step S510, the control routine deletes all time ranges in the data trace data structure that are outside of the list and continues to step S512. In step S512, the control routine returns control to the environment in which the control routine of FIG. 9 operates.

In step S510, the user of the method and system of the invention may choose from any number of storage management commands in addition to or in lieu of a delete command. Examples of other storage management commands include compressing, copying, moving and the like. It is to be understood that the method and system of this invention is not limited to any particular storage management function.

Freeform digital ink annotation is intended to mean a visible ink stroke of arbitrary shape made with a pointing device that persists over time. The system can infer some meaning from the shape or morphological characteristics of the ink stroke but does not remove the ink stroke once it is recognized.

It has been understood that the term "document" is intended to include text, video, audio and any other combination of media.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A method for annotating a data trace with freeform digital ink, the method comprising:

displaying a data trace representing data on a display, the data trace being a graphical representation of a time-varying signal;

receiving at least one freeform digital ink annotation on the data trace;

displaying the freeform digital ink annotation on the display of the data trace;

selecting at least one of the at least one freeform digital ink annotation;

identifying, for each selected freeform digital ink annotation, at least one portion of the data of the data trace associated with that selected freeform digital ink annotation; and managing a storage of the at least one portion of the data associated with the at least one selected freeform digital ink annotation;

wherein managing the storage of the at least one portion of the data comprises saving the identified at least one portion of the data and deleting remaining portions of the data.

2. The method of claim 1, further comprising mapping the at least one freeform digital ink annotation to corresponding portions of the data being represented on the display.

3. The method of claim 1, wherein managing the storage comprises one of deleting, compressing, copying, sending, transmitting and moving the identified at least one portion of the data.

4. The method of claim 1, where managing the identified at least one portion of the data comprises saving the identified at least one portion of the data and deleting remaining portions of the data.

5. A method for annotating a data trace with freeform digital ink, the method comprising:

displaying a data trace representing data on a display, the data trace being a graphical representation of a time-varying signal;

receiving at least one freeform digital ink annotation on the data trace;

displaying the freeform digital ink annotation on the display of the data trace;

selecting at least one of the at least one freeform digital ink annotation;

identifying, for each selected freeform digital ink annotation, at least one portion of the data of the data trace associated with that selected freeform digital ink annotation; and managing a storage of the at least one portion of the data associated with the at least one selected freeform digital ink annotation;

wherein managing the storage of the at least one portion of the data comprises saving the identified at least one portion of the data and compressing the remaining portions of the data.

6. The method of claim 1, further comprising, receiving a summary command; and presenting the portions of data that correspond with at least one freeform digital ink annotation along with at least one freeform digital ink annotation.

7. The method of claim 1, the data being at least one of medical, engineering, experimental, scientific, financial and business data.

8. A method for annotating a data trace with freeform digital ink, the method comprising:

displaying a data trace representing data on a display;

receiving at least one freeform digital ink annotation on the data trace;

displaying the freeform digital ink annotation on the display of the data trace;

selecting at least one of the at least one freeform digital ink annotation;

identifying, for each selected freeform digital ink annotation, at least one portion of the data of the data trace associated with that selected freeform digital ink annotation; and managing a storage of the at least one portion of the data associated with the at least one selected freeform digital ink annotation;

wherein the data trace is at least one of a barogram, an electrocardiogram, a kymogram, a polygram, a seismogram and a thermogram;

wherein managing the storage of the at least one portion of the data comprises saving the identified at least one portion of the data and deleting remaining portions of the data.

9. The method of claim 1, the data trace being an audio trace.

10. A method for annotating a data trace with freeform digital ink, the method comprising:

displaying a data trace representing data on a display, the data trace being a series of images from a video data stream;

receiving at least one freeform digital ink annotation on the data trace;

displaying the freeform digital ink annotation on the display of the data trace;

selecting at least one of the at least one freeform digital ink annotation;

identifying, for each selected freeform digital ink annotation, at least one portion of the data of the data trace associated with that selected freeform digital ink annotation; and managing a storage of the at least one portion of the data associated with the at least one selected freeform digital ink annotation;

wherein managing the storage of the at least one portion of the data comprises saving the identified at least one portion of the data and deleting remaining portions of the data.

11. A system for annotating a data trace with freeform digital ink, the system comprising:

a display of a data trace, the data trace being a graphical representation of a time-varying signal;

an input device for receiving at least one freeform digital ink annotation of the data trace, the display being responsive to the receipt of at least one freeform digital ink annotation to render the at least one freeform digital ink annotation on at least one corresponding portion of the data trace; and a processor that is responsive to a selection of at least one of the at least one freeform digital ink annotation to identify, for each selected freeform digital ink annotation, at least one portion of the data of the data trace associated with that selected freeform digital ink annotation and to manage a storage of the at least one portion of the data associated with the at least one selected freeform digital ink annotation;

wherein managing the storage of the at least one portion of the data comprises saving the identified at least one portion of the data and deleting remaining portions of the data.

12. The system of claim 11, further comprising a processor for mapping the at least one freeform digital ink annotation to a corresponding portion of the data being represented on the display.

13. The system of claim 11, the processor managing the storage of the data by at least one of deleting, compressing, copying, sending, transmitting and moving one of the identified at least one portion of the data and remaining portions of the data.

14. The system of claim 12, the display being responsive to a summary command to present the portions of data that correspond with at least one freeform digital ink annotation along with at least one freeform digital ink annotation.

15. The system of claim 12, the data being at least one of medical, engineering, experimental, scientific, financial and business data.

16. A system for annotating a data trace with freeform digital ink, the system comprising:

a display of a data trace;

an input device for receiving at least one freeform digital ink annotation of the data trace, the display being responsive to the receipt of at least one freeform digital ink annotation to render the at least one freeform digital ink annotation on at least one corresponding portion of the data trace; and a processor that is responsive to a selection of at least one of the at least one freeform digital ink annotation to identify, for each selected freeform digital ink annotation, at least one portion of the data of the data trace associated with that selected freeform digital ink annotation and to manage a storage of the at least one portion of the data associated with the at least one selected freeform digital ink annotation;

wherein the data trace is at least one of a barogram, an electrocardiogram, a kymogram, a polygram, a seismogram and a thermogram;

wherein managing the storage of the at least one portion of the data comprises saving the identified at least one portion of the data and deleting remaining portions of the data.

17. A system for annotating a data trace with freeform digital ink, the system comprising:

a display of a data trace, the data trace being a series of images from a video data stream;

an input device for receiving at least one freeform digital ink annotation of the data trace, the display being responsive to the receipt of at least one freeform digital ink annotation to render the at least one freeform digital ink on at least one corresponding portion of the data trace; and a processor that is responsive to a selection of at least one of the at least one freeform digital ink annotation to identify, for each selected freeform digital ink annotation, at least one portion of the data of the data trace associated with that selected freeform digital ink annotation and to manage a storage of the at least one portion of the data associated with the at least one selected freeform digital ink annotation;

wherein managing the storage of the at least one portion of the data comprises saving the identified at least one portion of the data and deleting remaining portions of the data.

18. A method for annotating a data trace with freeform digital ink, the method comprising:

inputting a data trace varying over a domain;

displaying the data trace on a display, the display defining a coordinate system, the domain of the data trace being independent of the coordinate system of the display;

receiving at least one freeform digital ink annotation of the data trace;

displaying the freeform digital ink annotation on the display, relative to the display of the data trace on the display;

selecting at least one of the at least one freeform digital ink annotation;

identifying, for each selected freeform digital ink annotation, at least one portion of the data of the data trace associated with that selected freeform digital ink annotation; and managing a storage of the at least one portion of the data associated with the at least one selected freeform digital ink annotation;

wherein managing the storage of the at least one portion of the data comprises saving the identified at least one portion of the data and deleting remaining portions of the data.

19. A system for annotating a data trace with free form digital ink, the system comprising:

a first input device for receiving a data trace varying over a domain;

a display defining a coordinate system, the data trace displayable on the display, the domain of the data trace being independent of the coordinate system of the display;

a second input device for receiving at least one freeform digital ink annotation of the data trace, the display being responsive to the receipt of at least one freeform digital ink annotation to display the at least one freeform digital ink annotation and at least one corresponding portion of the data trace; and a processor that is responsive to a selection of at least one of the at least one freeform digital ink annotation to identify, for each selected freeform digital ink annotation, at least one portion of the data of the data trace associated with that selected freeform digital ink annotation and to manage a storage of the at least one portion of the data associated with the at least one selected freeform digital ink annotation;

wherein managing the storage of the at least one portion of the data comprises saving the identified at least one portion of the data and deleting remaining portions of the data.

20. The method of claim 1, the data trace being a graphical representation of a time-varying signal.

21. The system of claim 11, the data trace being a graphical representation of a time-varying signal.

22. The method of claim 1, the data being associated with an external data source.

23. The system of claim 11, the data being associated with an external data source.

24. A The method of claim 1, wherein the data is associated with a graphical representation of a time varying signal.

25. The system of claim 12, wherein the data is associated with a graphical representation of a time varying signal.

* * * * *